US006205185B1

(12) United States Patent
Kajiwara (10) Patent No.: US 6,205,185 B1
(45) Date of Patent: Mar. 20, 2001

(54) SELF CONFIGURING MULTI-DWELLING SATELLITE RECEIVER SYSTEM

(75) Inventor: Tadashi Kajiwara, San Diego, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/387,867

(22) Filed: Sep. 1, 1999

(51) Int. Cl.[7] .................................................. H04L 27/06
(52) U.S. Cl. ............................... 375/316; 455/3.2
(58) Field of Search .............................. 375/316; 455/3.2, 455/4.2, 12.1; 342/374, 361, 352; 348/8

(56) References Cited

U.S. PATENT DOCUMENTS

| | | | |
|---|---|---|---|
| 4,626,858 | * 12/1986 | Copeland | 342/374 |
| 5,805,975 | * 9/1998 | Green, Sr. et al. | 455/3.2 |
| 5,835,128 | * 11/1998 | Macdonald et al. | 348/8 |
| 5,978,652 | * 11/1999 | Burr et al. | 455/12.1 |
| 5,995,818 | * 11/1999 | Smith | 455/302 |

* cited by examiner

*Primary Examiner*—Don N. Vo
(74) *Attorney, Agent, or Firm*—Wagner, Murabito & Hao LLP (57) ABSTRACT

In a receiver for a DBS (direct broadcasting satellite) system, a method of implementing multi-dwelling reception and normal reception. The method is implemented in receiver. The receiver of the present invention is capable of setting itself up for use with a DBS antenna unit and LNB without any intervention from the user. The present invention automatically configures itself for operation with either right-hand circular polarized signals or left-hand circular polarized signals as received from the antenna unit and LNB. The DBS system includes an antenna unit for receiving the DBS signal from the DBS satellite. The DBS signal is converted to a DBS IF (intermediate frequency) signal and is coupled to the receiver. The receiver receives the DBS IF signal and detects whether the IF signal is in a multi-dwelling format or a normal format by tuning to an upper band of the IF signal. If the multidwelling format is detected, the receiver configures itself for multi-dwelling reception. If the normal format is detected, the receiver configures itself for normal reception. The steps of receiving the DBS IF signal, detecting whether the IF signal is in a multi-dwelling format or a normal format, and configuring for multi-dwelling reception or normal reception are performed by the receiver automatically such that the receiver properly configures itself for operation without user intervention.

27 Claims, 9 Drawing Sheets

SELF CONFIGURING MULTI-DWELLING SATELLITE RECEIVER SYSTEM

FIELD OF THE INVENTION

The field of the present invention pertains to satellite receiver systems. More particularly, the present invention pertains to implementing a multidwelling satellite reception system for satellite receivers.

BACKGROUND OF THE INVENTION

Digital broadcast satellite (DBS) services are among the most popular consumer audio/video services to ever enter the market. Many thousands of consumers have purchased DBS systems to receive DBS delivered programming. According to industry statistics, DBS systems are among the fastest growing consumer electronic product categories.

DBS programming is delivered via satellite. Generally, the programming is transmitted from a central ground station to a satellite orbiting 22,300 miles above the equator where it is processed and broadcast back to Earth in a very broad RF signal. Because the signal beamed down to the Earth is so widely dispersed, the signal is available across a very large geographic area, such as for example, residences from Seattle, Washington, to Key West, Florida. The broadcast DBS signal is received via a DBS antenna unit, essentially an 18-inch satellite reception dish. The received signals are subsequently coupled to a DBS receiver. The DBS receiver decompresses and translates the digital DBS signal into analog television signal for display on a user's television.

Figure 1:
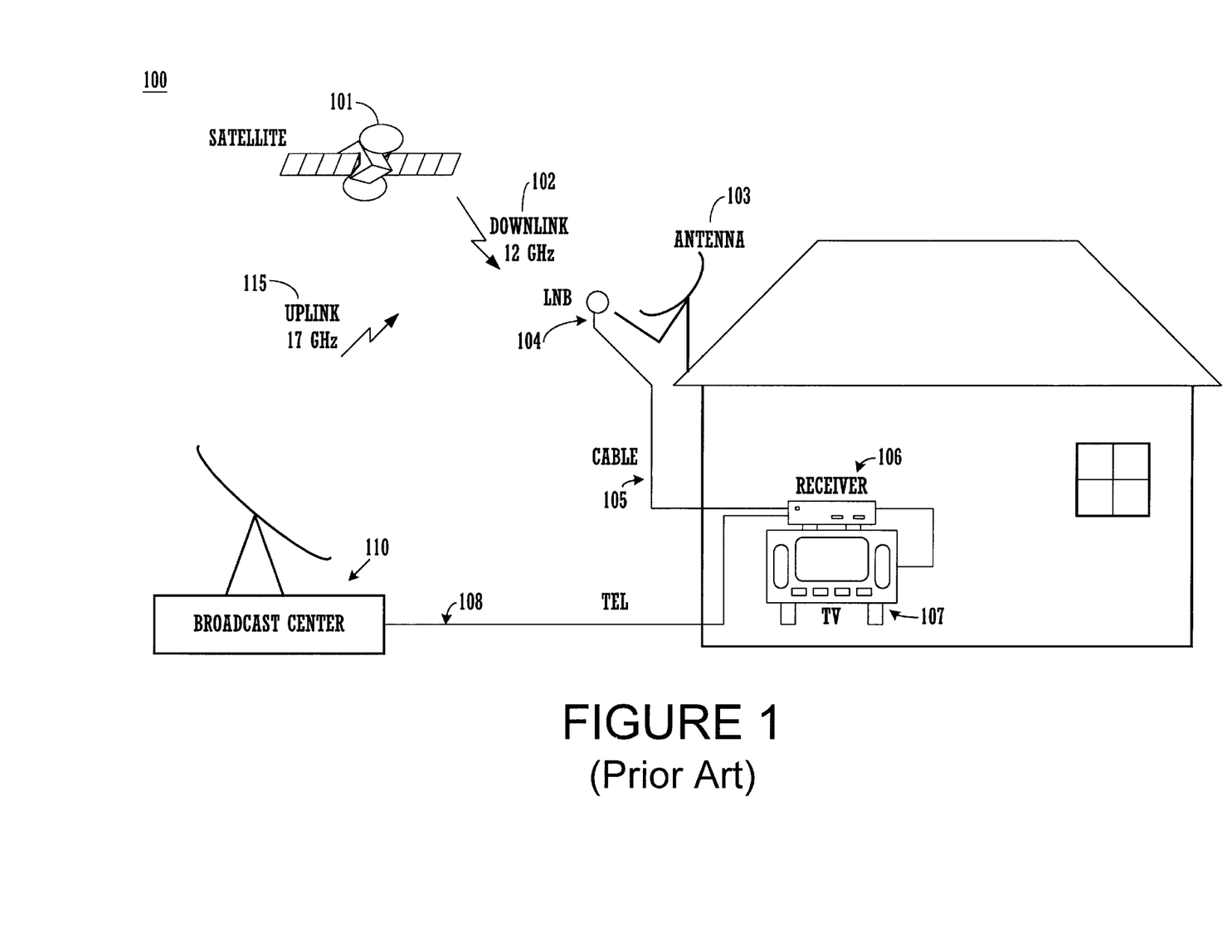
FIG. 1 shows a diagram of typical prior art DBS system.

Prior art FIG. 1 shows a diagram depicting the operation of a typical DBS system 100. System 100 includes a broadcast center 110 which functions by gathering programming content (e.g., movies, sporting events, commercials, etc.), digitizing encrypting, and uplinking the content to a DBS satellite 101 in geosynchronous orbit via a 17 GHz uplink signal 115. The DBS satellite 101 immediately retransmits the signal back down to every earth-station, or in other words, every DBS antenna unit 103 at every subscribers' homes/businesses, via a 12 GHz downlink signal 102. A low noise down converter (LNB) 104 is coupled to the antenna unit 103 for down converting the received 12 GHz downlink signal 102 into an IF (intermediate frequency) signal suitable for processing by receiver 106. The IF signal is coupled to receiver 106 via a coaxial cable 105. Receiver 106 functions by separating each digital channel in the IF signal, and decompressing and translating the channels so television 107 can show the programming to a user. Upstream communication is provided via a telephone line 108 coupled from receiver 106 back to the broadcast center 110.

There exists a problem with system 100, however, in that the format of the IF signal provided by LNB 104 to receiver 106 via cable 105 is often in different formats. Subscriber equipment (e.g., antenna unit 103, LNB 104, receiver 106, etc.) typically varies among the large number of users. Different components 103–106 are often provided by different manufacturers. Due to the nature of downlink signal 102, subscriber equipment is typically configured to use either left-hand circular or right-hand circular polarization of the IF signal 105 (or, vertical and horizontal polarization). These types of polarization are in the same frequency band. Hence, older types of subscriber equipment require the use of two cables coupling LNB 104 to receiver 106 to separately conduct left-hand circular and right-hand circular polarized signals respectively. Newer types of subscriber equipment are able to convert one type of signal (e.g., left-hand circular polarized) to a higher frequency band with respect to the other type of signal (e.g., right-hand circular polarized) so that only one cable (e.g., cable 105) is required to couple LNB 104 to receiver 106. The types of subscriber equipment are not readily combined by a user.

Thus, even a prior art subscriber equipment setup capable of functioning in both a "multi-dwelling" manner (e.g., left-hand and right-hand circular polarization in a single cable) and a "normal" manner (e.g., left-hand and right-hand circular polarization in separate cables) requires manual configuration and initialization by the user. Unfortunately, this most often involves the user reading a manual to best understand how to set the subscriber equipment up such that it functions correctly. Manual configuration is error prone and inconvenient. If successful (e.g., the user turns, pushes, and otherwise manipulates the appropriate dials, switches, and/or jumpers on LNB 104 and receiver 106), system 100 functions as desired. However, if the configuration is incorrect, receiver 106 will not work and the user will be frustrated.

SUMMARY OF THE INVENTION

Thus, what is needed is a system whereby when the receiver is turned on, the receiver automatically sets itself up for the correct operating mode (e.g. normal mode or multi-dwelling mode). The required system should set itself up without any intervention from the user. The required system should automatically configure itself for operation with either right-hand circular polarized signals, left-hand circular polarized signals, or both, as the subscriber equipment situation dictates. Accordingly, the present invention provides a novel solution to these requirements.

The present invention is directed to a self configuring DBS receiver for use in a DBS system. The receiver of the present invention is capable of setting itself up for use with a DBS antenna unit and LNB without any intervention from the user. The present invention automatically configures itself for operation with either right-hand circular polarized signals or left-hand circular polarized signals as received from the antenna unit and LNB. The system of the present invention automatically configures the receiver for the correct operating mode, as dictated by a user's existing subscriber equipment, without requiring input, control, intervention, etc., from the user. In so doing, a more easily used, more reliable, more robust DBS system is provided to the user.

In one embodiment, the process of the present invention is implemented using software/hardware within a DBS receiver for executing the automatic, self configuring functionality. The receiver includes the hardware (e.g., tuners, storage elements, etc.) and an embedded computer system platform necessary for implementing both multi-dwelling reception and normal reception. The DBS system includes an antenna unit for receiving the DBS signal from the DBS satellite and an LNB for down-converting the downlink signal received from the DBS satellite. The DBS signal is converted to a IF (intermediate frequency) signal and is coupled to the receiver. The receiver receives the IF signal and detects whether the IF signal is in a multi-dwelling format or a normal format by tuning to an upper band of the IF signal. If the multi-dwelling format is detected (e.g., modulated data detected in the upper band), the receiver configures itself for multi-dwelling reception. If the normal format is detected (e.g., no modulated data detected in the upper band), the receiver configures itself for normal reception.

The steps of receiving the DBS IF signal, detecting whether the IF signal is in a multi-dwelling format or a normal format, and configuring for multidwelling reception or normal reception are performed by the receiver automatically such that the receiver properly configures itself for operation without user intervention. In so doing, the receiver automatically configures itself for the correct operating mode without requiring input, control, intervention, etc., from a user, thereby providing a more easily used, more reliable, more robust DBS system.

BRIEF DESCRIPTION OF THE DRAWINGS

The present invention is illustrated by way of example and not by way of limitation, in the figures of the accompanying drawings and in which like reference numerals refer to similar elements and in which.

Prior art

DETAILED DESCRIPTION OF THE INVENTION

Reference will now be made in detail to the embodiments of the invention, a multi-dwelling satellite receiver system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed to a self configuring DBS receiver for use in a DBS system. The receiver of the present invention is capable of setting itself up for use with the different configurations of subscriber equipment typically found at user locations (e.g., DBS antenna unit and LNB) without any intervention from the user. The present invention automatically configures itself for operation with either right-hand circular polarized signals or left-hand circular polarized signals as received from the antenna unit and LNB. The system of the present invention automatically configures the receiver for the correct operating mode, as dictated by a user's existing subscriber equipment, without requiring input, control, intervention, etc., from the user. In so doing, a more easily used, more reliable, more robust DBS system is provided to the user.

Notation and nomenclature

Figure 8:
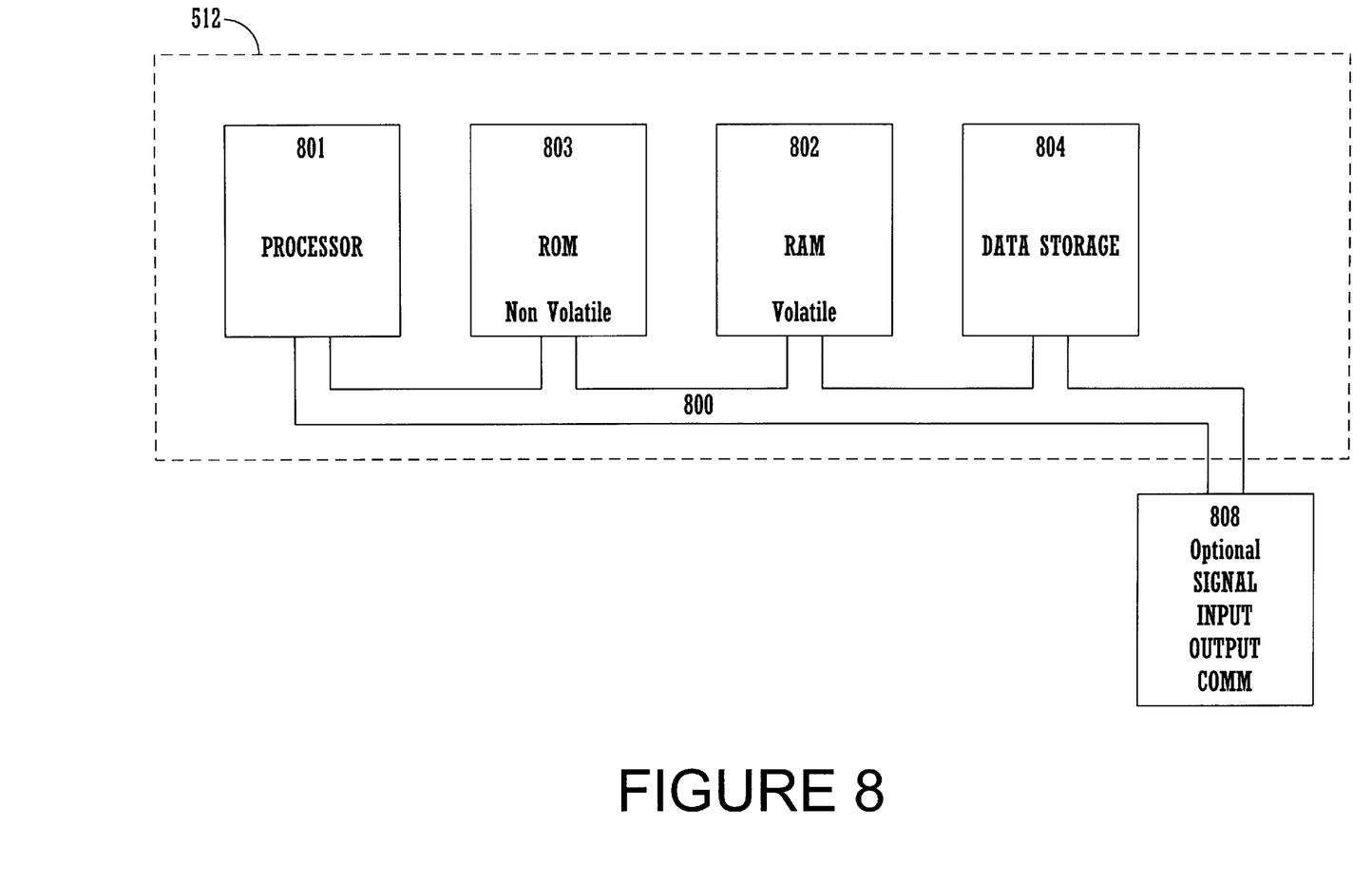
FIG. 8 shows a diagram of an embedded computer system in accordance with one embodiment of the present invention included in the receiver of FIG. 5.

Some portions of the detailed descriptions which follow are presented in terms of procedures, steps, logic blocks, processing, and other symbolic representations of operations on data bits within a computer memory (e.g., embedded computer system 512 of FIG. 8). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "executing" or "configuring" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
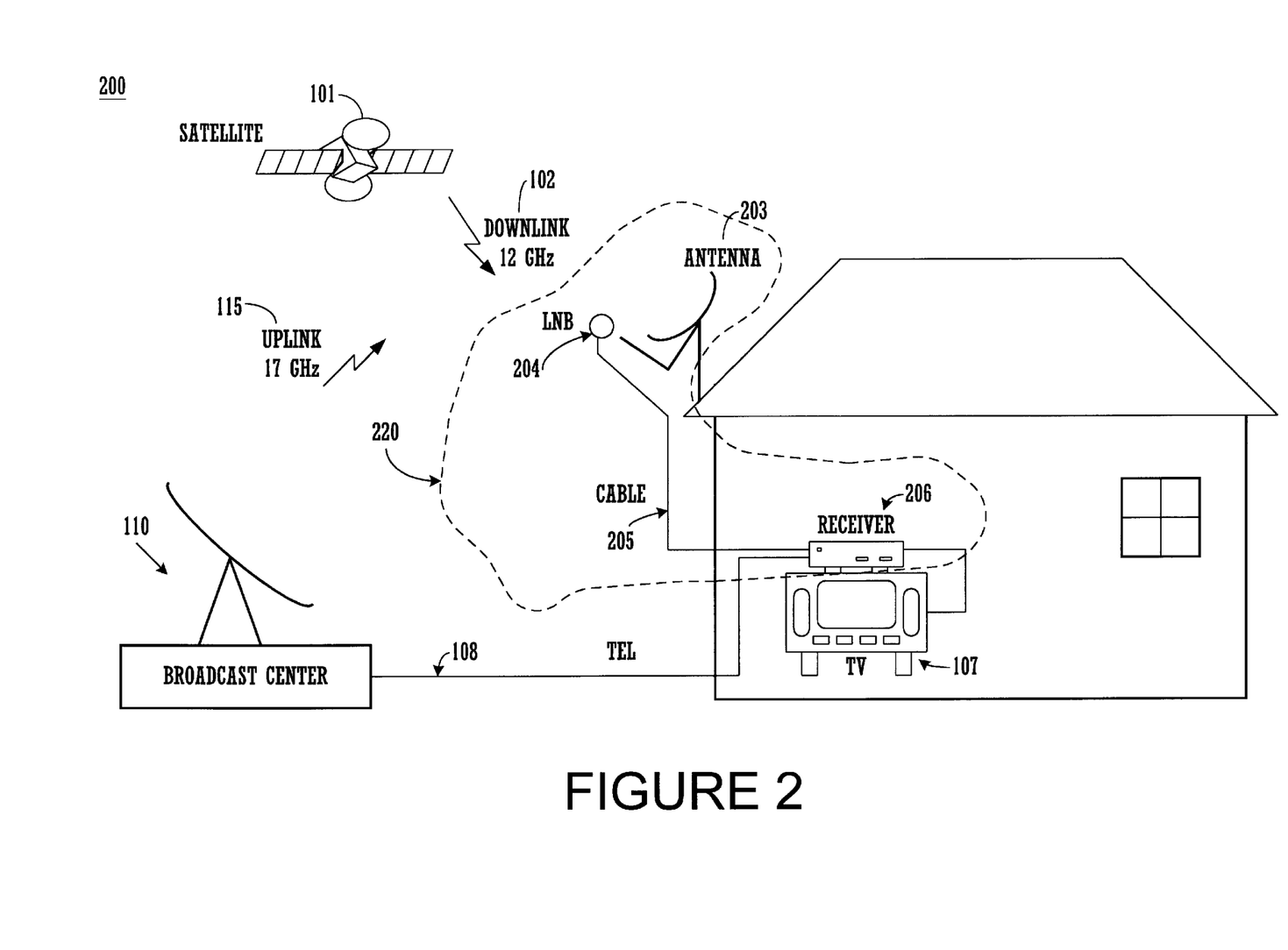
FIG. 2 shows an overview diagram of a DBS system in accordance with one embodiment of the present invention, including a subscriber equipment setup in accordance with one embodiment of the present invention.

FIG. 2 shows an overview diagram depicting the operation of a DBS system 200 in accordance with one embodiment of the present invention. System 200 includes improved subscriber equipment 220 (e.g., components 203–206) capable of automatic self configuring and self set up. In accordance with the present invention, subscriber equipment setup 220 automatically configures itself without user intervention. In the present embodiment, this functionality is primarily provided by receiver 206.

As with typical DBS systems, system 200 includes a broadcast center 110 which functions by gathering programming content, and digitizing, encrypting, and uplinking the content to a DBS satellite 101 via a 17 GHz uplink signal 115. The DBS satellite 101 retransmits the signal back down to each subscribers' home/business, via a 12 GHz downlink signal 102.

An LNB 204 is coupled to antenna unit 203 for down converting the received 12 GHz downlink signal 102 into an IF signal which is processed by receiver 206 of the present invention. Receiver 206 separates the individual transponder channels in the IF signal 205, and decompresses and translates the channels so television 107 can show the programming to a user. Receiver 206 communicates upstream via a telephone line 108 back to the broadcast center 110.

Referring still to FIG. 2, as described above, the functionality of receiver 206 allows the subscriber equipment 220 to automatically self configure and self set up with regard to the format of the IF signal down converted from antenna unit 203 by LNB 204. Thus, in a case where LNB 204 is designed to down convert downlink signal 102 into either a right-hand circular polarized IF signal or a left-hand circular polarized IF signal (referred to as "normal" mode) receiver 206 automatically configures itself to receive the normal mode signal. Additionally, in a case where LNB 204 is designed for "multi-dwelling" operation, wherein downlink signal 102 is converted into a multi-dwelling format (e.g., as shown in FIG. 3), receiver 206 automatically configures itself to receive the multi-dwelling format signal.

In the present embodiment, the receiver 206 receives the IF signal 205 and detects whether the IF signal 205 is in a multi-dwelling format or a normal format by tuning to an upper band of the IF signal 205. If the multi-dwelling format is detected, the receiver 206 configures itself for multi-dwelling reception. If the normal format is detected, the receiver configures itself for normal reception. In so doing, receiver 206 of the present embodiment automatically configures itself for the correct operating mode, as dictated by a user's existing subscriber equipment (e.g., LNB 204 and antenna unit 203).

Figure 3:
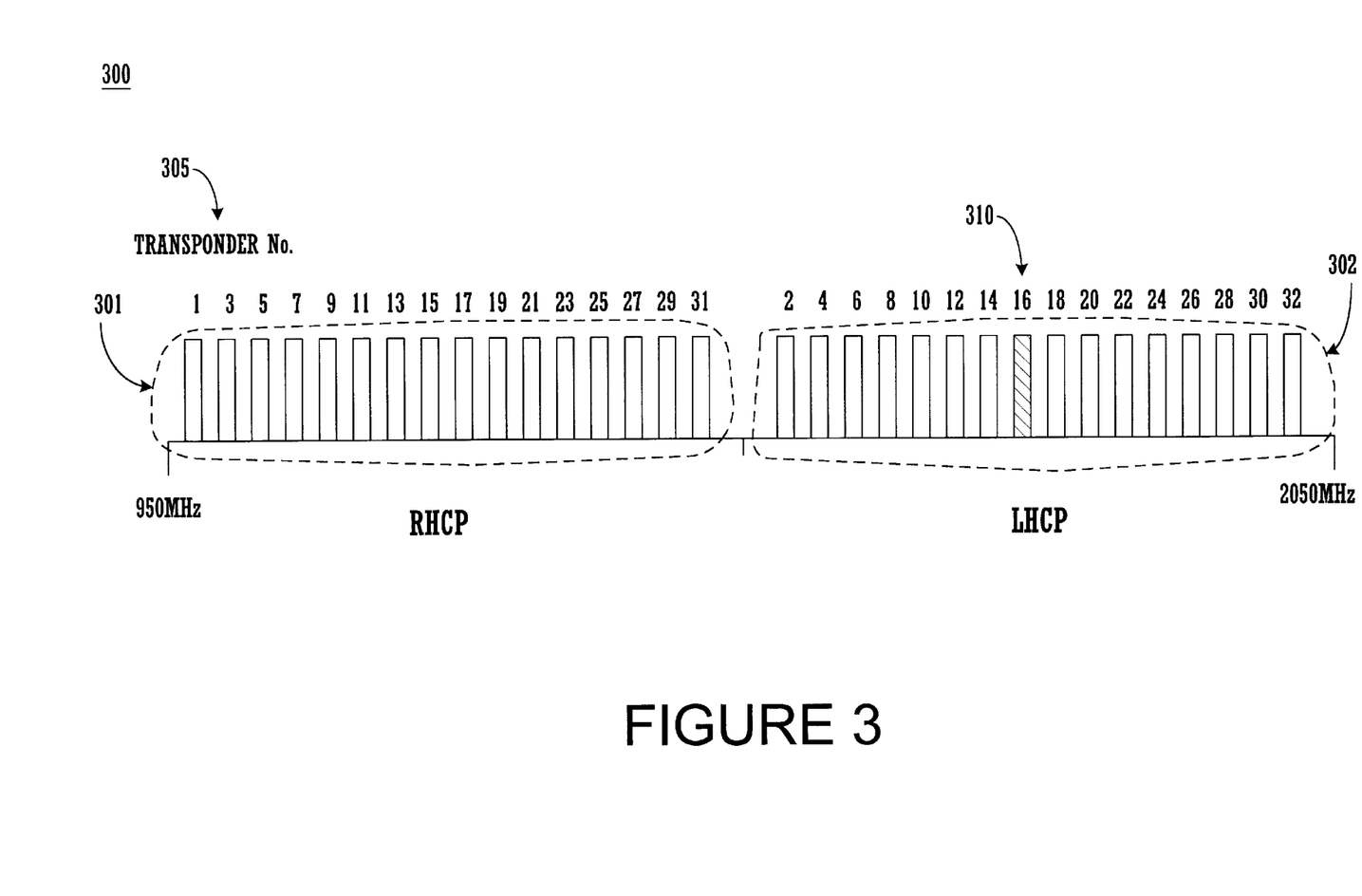
FIG. 3 shows a diagram of a multi-dwelling format signal in accordance with one embodiment of the present invention.

Referring now to FIG. 3, a diagram 300 of a multi-dwelling signal as received by receiver 206 of the present invention is shown. Diagram 300 depicts the spectral content of the transponder signals comprising the right-hand circular polarized component 301 of IF signal 205 and the left-hand circular polarized component 302, spanning the frequency range from 950 MHz to 2050 MHz. The DBS satellite includes 32 separate transponders, transmitting 32 corresponding transponder signals, as shown by transponder numbers 305, depicted across the top of components 301 and 302, from left to right. Each transponder signal carries (e.g., is modulated with) a respective portion of the downlink signal 102. The odd number transponders (odd numbers 1–31) comprise the right-hand circular polarized component 301 while the even number transponders (even numbers 2–32) comprise the left-hand circular polarized component 302.

As known by those skilled in the art, in a multi-dwelling IF signal, the two components 301–302 are spectrally separated during down conversion and combined into a single signal (e.g., cable 205). There is no frequency overlap between the right-hand circular polarized component 301 and the left-hand circular polarized component 302. Hence, receiver 206 can receive both components 301–302 while operating in a multi-dwelling mode.

As described above, in the present embodiment, the receiver 206 detects whether the IF signal is in a multi-dwelling format or a normal format by tuning to an upper band of the IF signal, as shown by arrow 310. If the multi-dwelling format signal (e.g., in this case, transponder 16) is detected, the receiver 206 configures itself for multi-dwelling reception. If the normal format is detected (e.g., no signal is detected), the receiver 206 configures itself for normal reception.

Figure 4:
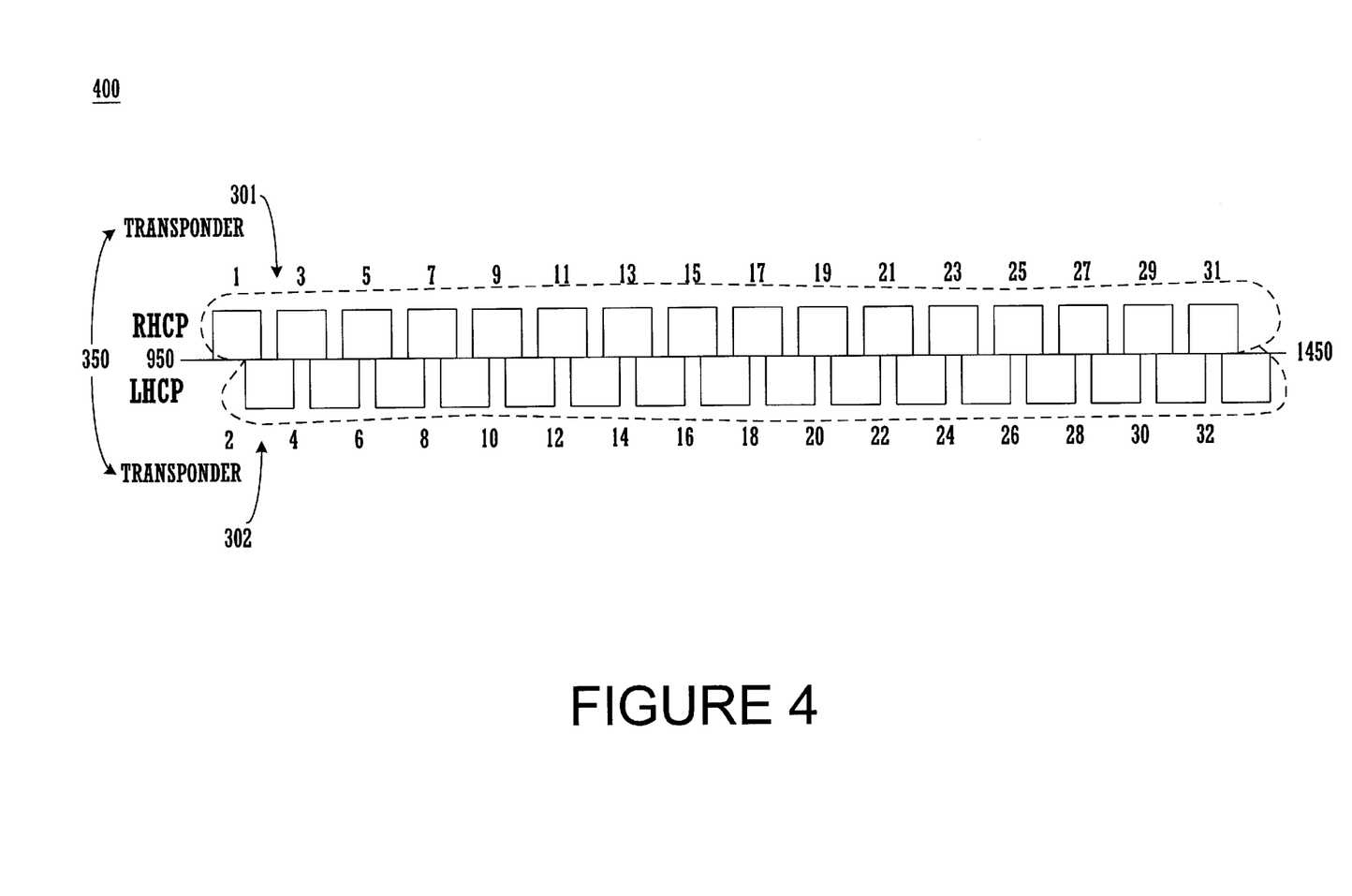
FIG. 4 shows a diagram of a normal format signal, wherein the lefthand circular and a right-hand circular polarized signal are overlapped in frequency within the IF signal frequency band.

Referring now to FIG. 4, a diagram 400 showing the frequency overlap of the two components 301–302 as in the case of a normal format IF signal is shown. Diagram 400, as with diagram 300, depicts the spectral content of the transponder signals comprising the right-hand circular polarized component 301 and the left-hand circular polarized component 302 of IF signal 205. In the normal format case however, the IF signal spans the frequency range from 950 MHz to 1450 MHz. This is due to the fact that, as described above, with the normal format, component 301 and component 302 overlap each other in frequency. This is depicted in diagram 400 with component 301 being on the upper half of the horizontal axis and component 302 being on the lower half. Hence, with a LNB 204 designed to function with a normal format IF signal, either the right-hand circular polarized component 301 or the left-hand circular polarized component 302 is transmitted across cable 205, but not both. In accordance with the present invention, receiver 206 can automatically configure itself to operate in a normal mode and receive either component 301 or component 302.

Figure 5:
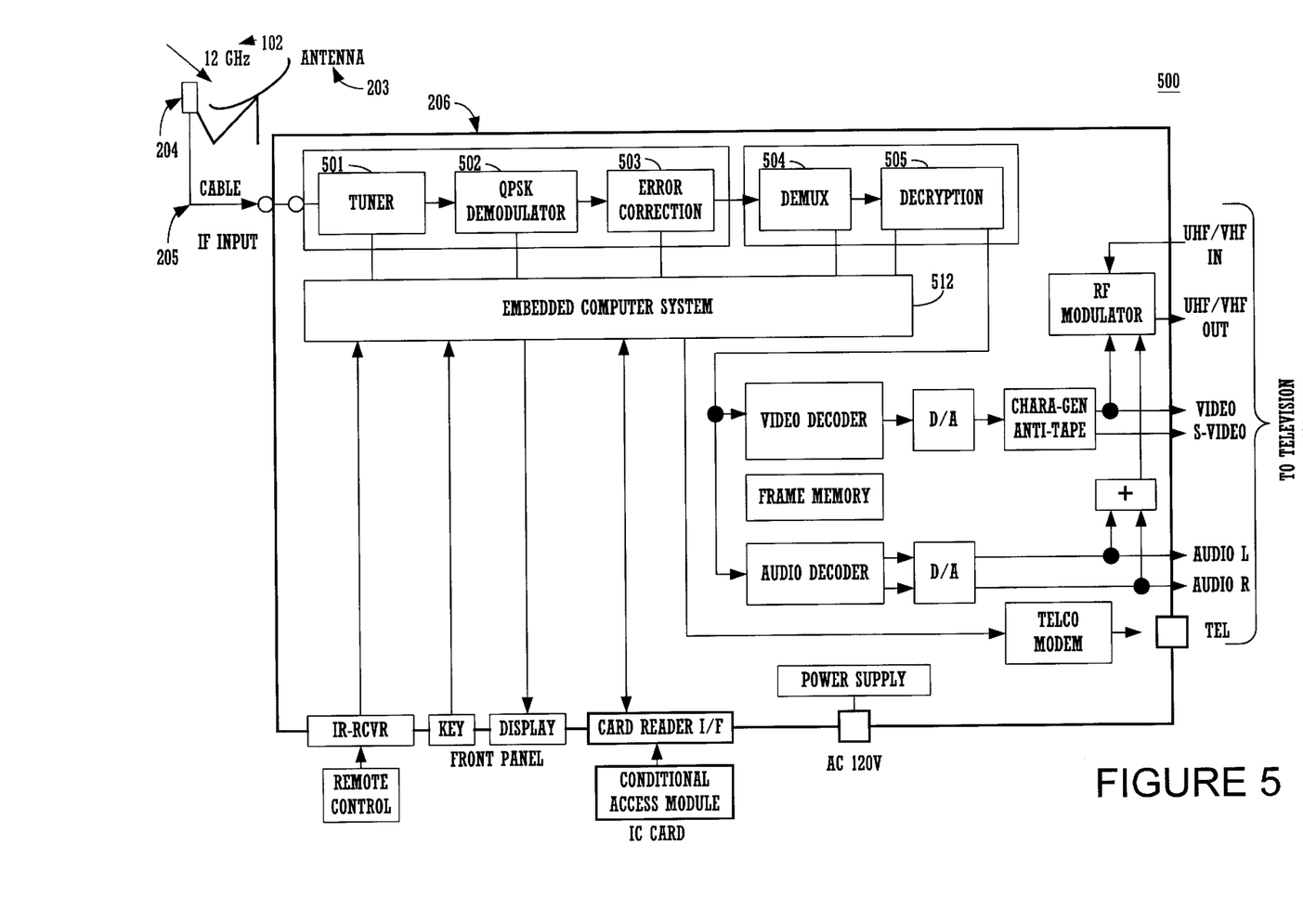
FIG. 5 shows a block diagram of the components of a DBS receiver in accordance with one embodiment of the present invention.

FIG. 5 shows a block diagram 500 of receiver 206 of one embodiment of the present invention. As depicted in diagram 500, receiver 206 includes a tuner 501 for receiving either the multi-dwelling format IF signal or the normal format IF signal 205. The output of tuner 501 is passed to a quadriture phase shift keying demodulator 502 and error correction unit 503. The resulting signal is then de-multiplexed and decrypted (e.g., using a demux 504 and decrypter 505). The decrypted signal is then audio and video decoded, D/A converted, and formatted for output to television 107. The functionality of the present embodiment is implemented by software executing on embedded computer system 512. Embedded computer system 512 controls the overall operation of receiver 206.

Figure 6:
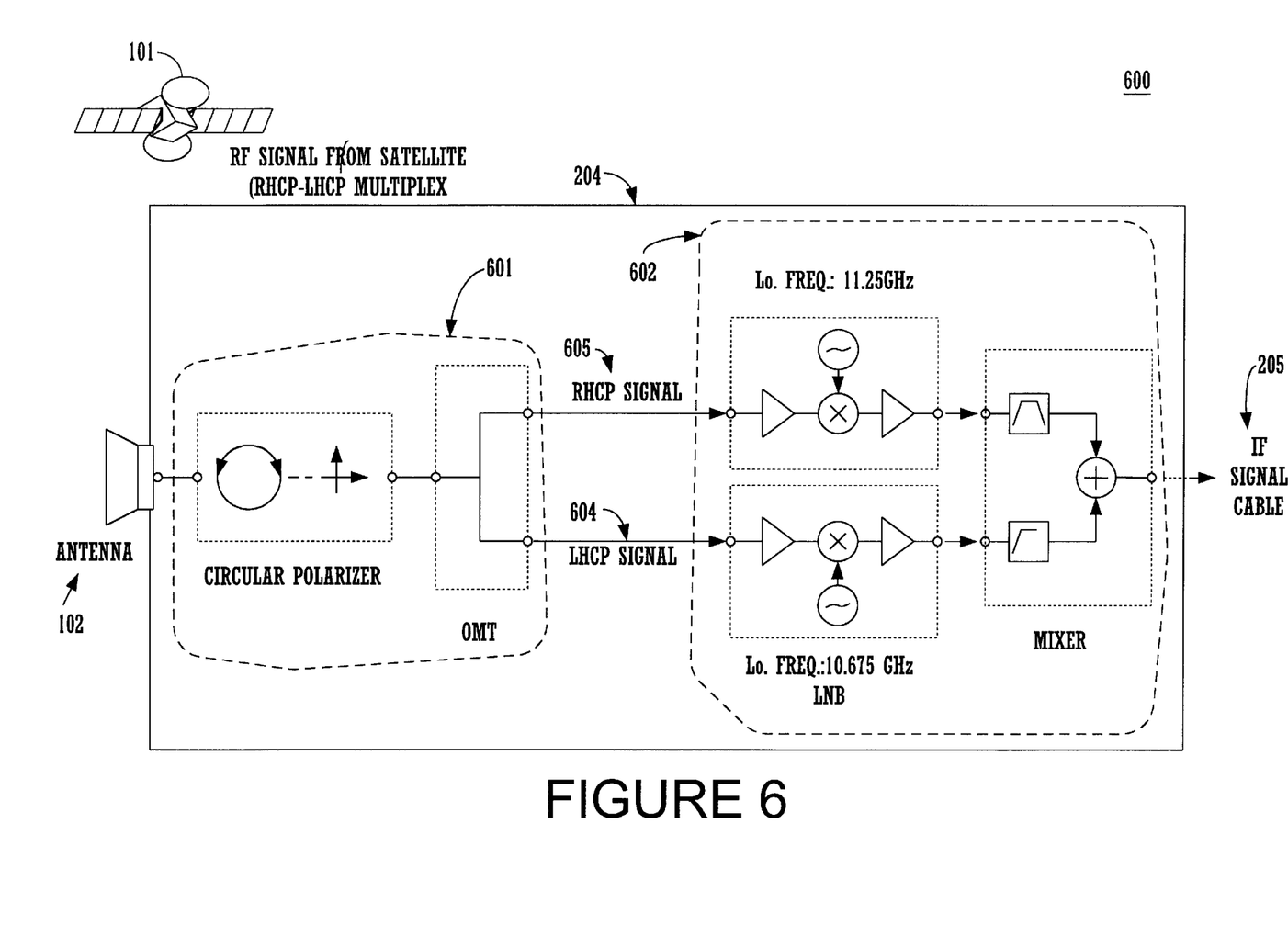
FIG. 6 shows a block diagram of the components of an LNB for multidwelling reception in accordance with one embodiment of the present invention.

FIG. 6 shows a block diagram 600 of the LNB 204. In this example, LNB 204 is depicted as a multi-dwelling designed LNB for producing a multi-dwelling format IF signal. LNB 204 is comprised of a front-end 601 and a back-end 602. The front end 601 functions by synchronizing with the 12 GHz downlink signal received from satellite 101, producing both a right-hand circular polarized signal 603 and a left-hand circular polarized signal 604.

The back end 602 functions by down converting signals 603–604 to the lower IF range, and converting them into the multi-dwelling format for the IF signal. The signals 603–604 are down-converted by separate respective local frequency oscillators and mixed into the one cable 205 by a mixer.

Figure 7:
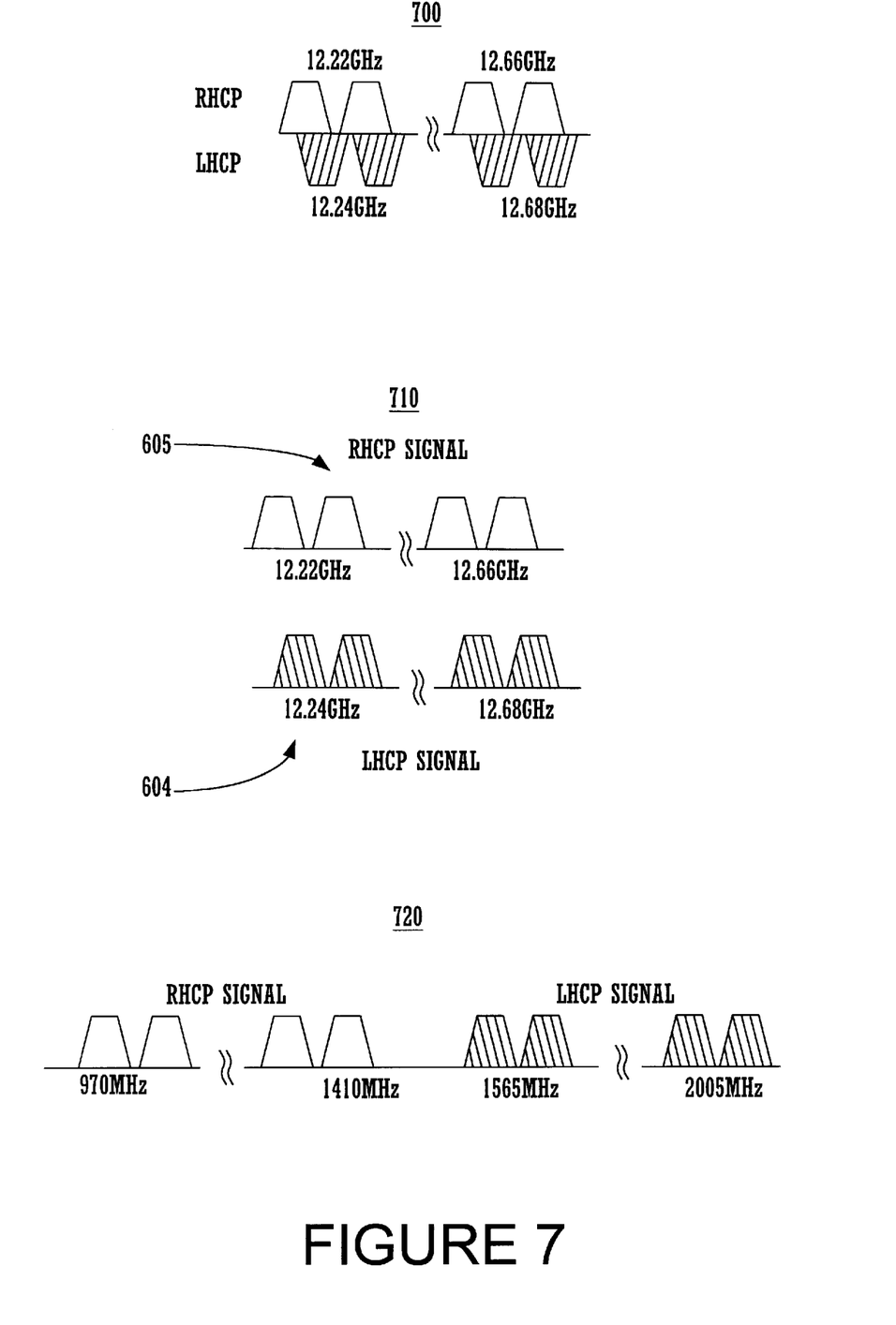
FIG. 7 shows diagrams depicting the relationship of the right and left-hand circular polarized signal components as they proceed through the LNB of FIG. 6.

FIG. 7 shows diagrams 700, 710, and 720 showing the relationship between the right-hand circular polarized signal and the left-hand circular polarized signal as they proceed through the LNB 204. Diagram 700 shows the frequency overlap of the right-hand circular polarized signal (RHCP) and the left-hand circular polarized signal (LHCP) as received by front end 601 of LNB 204. Diagram 710 shows the separate RHCP and LHCP signals as they emerge from front end 601 on separate lines. Diagram 720 shows the combined RHCP and LHCP signal after down conversion and mixing in the back end 602 of LNB 204.

With reference now to FIG. 8, a diagram of an embedded computer system 512 in accordance with one embodiment of the present invention is shown (e.g., embedded computer system 512 from FIG. 5). As described above, embedded computer system 512 functions in part by providing a computer system platform for implementing software of the present invention. Embedded computer system 512 of FIG. 8 includes an address/data bus 800 for communicating information, one or more central processors 801 coupled with the bus 800 for processing information and instructions, a volatile memory 802 (e.g., random access memory RAM) coupled to the bus 800 for storing information and instructions for the central processor 801 and a nonvolatile memory 803 (e.g., read only memory ROM) coupled to the bus 800 for storing static information and instructions for the processor 801. Embedded computer system 512 can also optionally include data storage hardware 804, such as a flash memory or magnetic disk, for storing information and instructions. A bus interface/signal input output communications unit 808 for interfacing with the remaining components of receiver 206 is also included. Embedded computer system 512 can operate under a variety of different operating systems (e.g., Aperios™ operating system, etc.).

Figure 9:
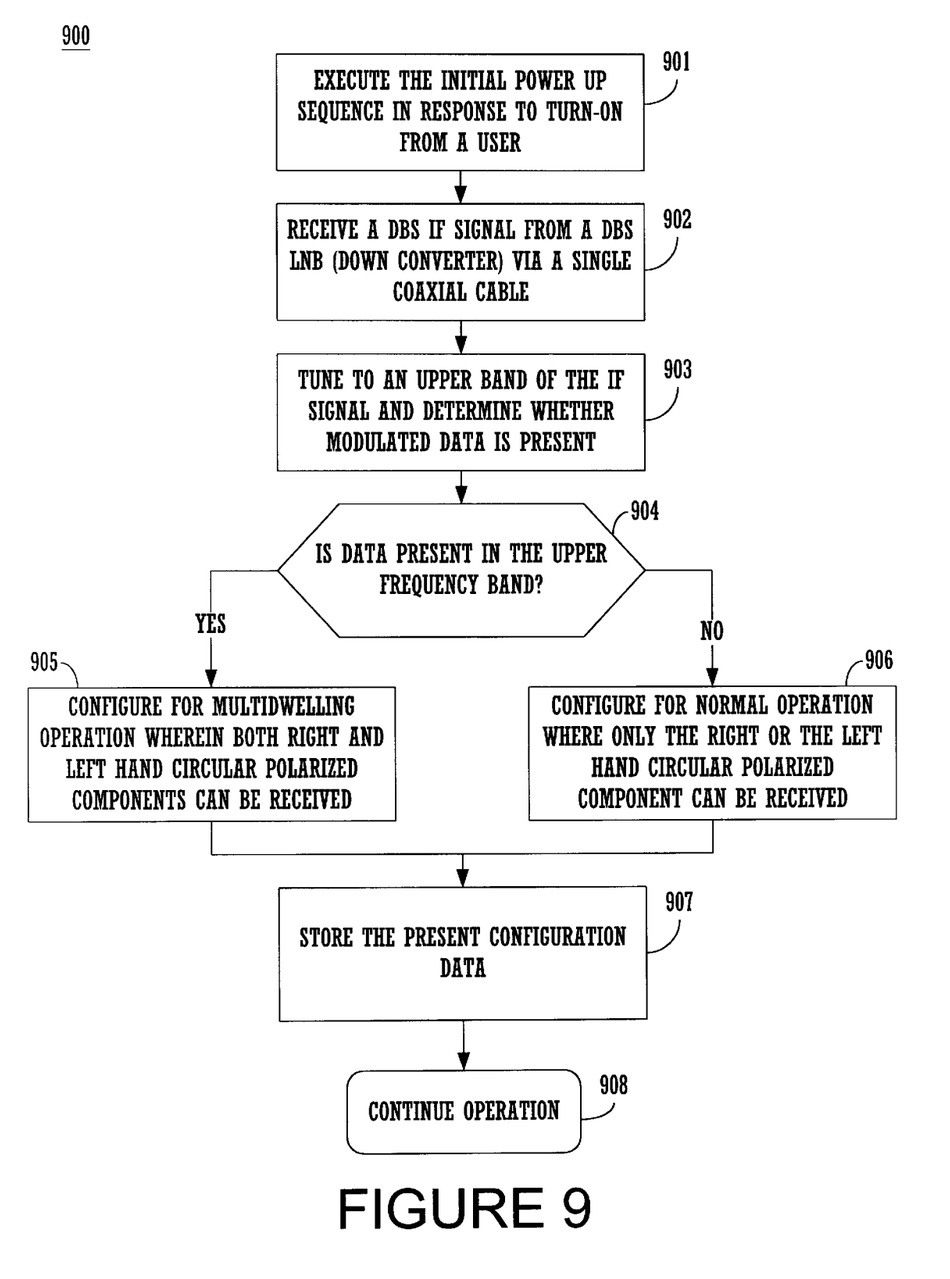
FIG. 9 shows a flowchart of the steps of a receiver automatic self configuration operating process in accordance with one embodiment of the present invention.

Referring now to FIG. 9, a flowchart of the steps of a process 900 in accordance with one embodiment of the present invention is shown. Process 900 can be implemented as instructions stored in a computer readable memory and executed by a processor. Process 900 depicts the operating steps of a DBS receiver (e.g., receiver 206 of FIG. 2) as it automatically configures itself after an initial power-up for operation with either a multi-dwelling type LNB or a normal type LNB.

Process 900 begins in step 901, where a DBS receiver in accordance with one embodiment of the present invention (e.g., receiver 206) is initially powered-up by a user within the context of the user's subscriber equipment setup (e.g., subscriber equipment 220 of FIG. 2). In step 902, as described above, receiver 206 receives an IF signal from a coupled LNB (e.g., LNB 204) via a single coaxial cable. Then in step 903, the receiver tunes to an upper band (e.g., 1450 to 2050 MHz) to determine whether the IF signal is in a multi-dwelling format or in a normal format.

Referring still to process 900 of FIG. 9, in step 904, receiver 206 tunes to the upper band of the IF signal to determine whether modulated data is present. In step 905, if modulated data is present in the upper band as determined in step 904, receiver 206 configures itself for multi-dwelling operation wherein both right and left-hand circular polarized components of the IF signal can be received across the single cable. Whereas, in step 906, if modulated data is not present in the upper band as determined in step 904, receiver 206 configures itself for normal operation wherein either the right or the left-hand circular polarized IF signal is received via the single cable.

Subsequently, in step 907, receiver 206 stores the resulting configuration information (for subsequent operation) in an internal memory (e.g., data storage 804 of FIG. 8), and in step 908, continues operation in accordance with the proper operating mode determined in steps 905 and 906.

Thus, the present invention is an automatic self configuring DBS receiver for use in a DBS system. The receiver of the present invention is capable of setting itself up for use with a DBS antenna unit and LNB without any intervention from the user. The present invention automatically configures itself for operation with either right-hand circular polarized signals or left-hand circular polarized signals as received from the antenna unit and LNB. The system of the present invention automatically configures the receiver for the correct operating mode, as dictated by a user's existing subscriber equipment, without requiring input, control, intervention, etc., from the user. In so doing, a more easily used, more reliable, more robust DBS system is provided to the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. In a receiver for a DBS (digital broadcast satellite) system, an automatic configuring method of implementing multi-dwelling reception and normal reception comprising the steps of:
    a) receiving an intermediate frequency signal from a DBS antenna unit;
    b) detecting whether the intermediate frequency signal is in a multi-dwelling format or a normal format by tuning to an upper band of the intermediate frequency signal;
    c) if the multi-dwelling format is detected in step b), configuring the receiver for multi-dwelling reception; and
    d) if the normal format is detected in step b), configuring the receiver for normal reception, wherein steps b), c), and d) are performed automatically to configure the receiver without user intervention.

2. The method of claim 1 further including the step of detecting whether the intermediate frequency signal is in the multi-dwelling format or the normal format by tuning to an upper band of the intermediate frequency and determining whether modulated data is present.

3. The method of claim 2 wherein the intermediate frequency is in the multi-dwelling format if modulated data is detected in the upper band.

4. The method of claim 2 wherein the intermediate frequency is in the normal format if modulated data is not detected in the upper band.

5. The method of claim 1 further including the step of receiving the intermediate frequency signal from an LNB (low noise down converter) coupled to the DBS antenna unit.

6. The method of claim 1 wherein the upper band of the intermediate frequency includes the range 1450 MHz to 2050 MHz and a lower band of the intermediate frequency includes the range 950 MHz to 1450 MHz.

7. The method of claim 6 wherein the multi-dwelling format intermediate frequency signal includes a right-hand circular polarized component in the lower band and a left-hand circular polarized component in the upper band.

8. The method of claim 1 wherein the multi-dwelling format intermediate frequency signal includes a right-hand circular polarized component and a left-hand circular polarized component.

9. The method of claim 1 wherein the normal format intermediate frequency signal includes a right-hand circular polarized component.

10. The method of claim 1 wherein the normal format intermediate frequency signal includes a left-hand circular polarized component.

11. In a receiver for a DBS (digital broadcast satellite) system, a method of implementing automatic configuration for operating with multidwelling reception and normal reception comprising the steps of:
    a) receiving an intermediate frequency signal from a LNB (low noise down converter) coupled to a DBS antenna unit;
    b) detecting whether the intermediate frequency signal is in a multidwelling format or a normal format by tuning to an upper band of the intermediate frequency signal, wherein the upper band of the intermediate frequency signal includes the range of 1450 MHz to 2050 MHz and a lower band of the intermediate frequency signal includes the range of 950 MHz to 1450 MHz;

c) if the multi-dwelling format is detected in step b), configuring the receiver for multi-dwelling reception; and d) if the normal format is detected in step b), configuring the receiver for normal reception, wherein steps b), c), and d) are performed automatically to configure the receiver without user intervention.

12. The method of claim 11 further including the step of detecting whether intermediate frequency signal is in the multi-dwelling format or the normal format by tuning to the upper band and determining whether modulated data is present in the upper band.

13. The method of claim 12 wherein the intermediate frequency signal is in the multi-dwelling format if modulated data is detected in the upper band.

14. The method of claim 12 wherein the intermediate frequency signal is in the normal format if modulated data is not detected in the upper band.

15. The method of claim 12 wherein the multi-dwelling format intermediate frequency signal includes a right-hand circular polarized component in the lower band and a left-hand circular polarized component in the upper band.

16. The method of claim 11 wherein the multi-dwelling format intermediate frequency signal includes a right-hand circular polarized component and a left-hand circular polarized component.

17. The method of claim 11 wherein the normal format intermediate frequency signal includes a right-hand circular polarized component in the lower band.

18. The method of claim 11 wherein the normal format intermediate frequency signal includes a left-hand circular polarized component in the lower band.

19. A DBS (digital broadcast satellite) receiver for a DBS system including an embedded computer system having a processor coupled to a memory via a bus, the memory storing software which when executed causes the receiver to implement a method of automatic configuration for operating with multi-dwelling reception and normal reception, the method comprising the steps of:

a) receiving an intermediate frequency signal from a LNB (low noise down converter) coupled to a DBS antenna unit;

b) detecting whether the intermediate frequency signal is in a multi-dwelling format or a normal format by tuning to an upper band of the intermediate frequency signal, wherein the upper band of the intermediate frequency signal includes the range of 1450 MHz to 2050 MHz and a lower band of the intermediate frequency signal includes the range of 950 MHz to 1450 MHz;

c) if the multi-dwelling format is detected in step b), configuring the receiver for multi-dwelling reception; and d) if the normal format is detected in step b), configuring the receiver for normal reception, wherein steps b), c), and d) are performed automatically to configure the receiver without user intervention.

20. The receiver of claim 19 further including the step of detecting whether the intermediate frequency signal is in the multi-dwelling format or the normal format by tuning to the upper band of the intermediate frequency and determining whether modulated data is present in the upper band.

21. The receiver of claim 20 wherein the intermediate frequency is in the multi-dwelling format if modulated data is detected in the upper band.

22. The receiver of claim 20 wherein the intermediate frequency is in the normal format if modulated data is not detected in the upper band.

23. The receiver of claim 20 wherein the multi-dwelling format intermediate frequency signal includes a right-hand circular polarized component in the lower band and a left-hand circular polarized component in the upper band.

24. The receiver of claim 19 wherein the multi-dwelling format intermediate frequency signal includes a right-hand circular polarized component and a left-hand circular polarized component.

25. The receiver of claim 19 wherein the normal format intermediate frequency signal includes a right-hand circular polarized component in the lower band.

26. The receiver of claim 19 wherein the normal format intermediate frequency signal includes a left-hand circular polarized component in the lower band.

27. An automatic configuring receiver for a DBS (digital broadcast satellite) system, comprising:

means for receiving an intermediate frequency signal from a DBS antenna unit;

means for detecting whether the intermediate frequency signal is in a multi-dwelling format or a normal format by tuning to an upper band of the intermediate frequency signal;

means for configuring the receiver for multi-dwelling reception if the multi-dwelling format is detected by the detecting means; and means for configuring the receiver for normal reception if the normal format is detected by the detecting means wherein the configuring for multi-dwelling reception or the configuring for normal reception are performed automatically to configure the receiver without user intervention.

* * * * *